United States Patent [19]
Kamm et al.

[11] Patent Number: 5,242,200
[45] Date of Patent: Sep. 7, 1993

[54] ARRANGEMENT OF MOLDED PARTS SUCH AS BUMPERS OR THEIR TRIM IN AUTOMOTIVE VEHICLES

[76] Inventors: Artur Kamm, Weissenburger Str. 52, 8830 Treuchtlingen; Otto Schmidt, Steigerfurtweg 48, 8700 Würzburg; Karl-Peter Schütt, Igelweg 19; Udo Waltemade, Heppenheimer Str. 42, both of 6090 Russelsheim, all of Fed. Rep. of Germany

[21] Appl. No.: 878,409

[22] Filed: May 4, 1992

Related U.S. Application Data

[63] Continuation of Ser. No. 582,399, Sep. 12, 1990, abandoned.

[30] Foreign Application Priority Data

Sep. 12, 1989 [DE] Fed. Rep. of Germany ....... 3930430

[51] Int. Cl.⁵ .............................. B60R 19/24
[52] U.S. Cl. .................................. 293/126; 293/154; 293/155; 52/718.04
[58] Field of Search .............. 293/120, 126, 128, 154, 293/515; 428/31; 52/717.1, 718.1

[56] References Cited

U.S. PATENT DOCUMENTS

| 4,165,083 | 8/1979 | Dochnahl | 52/718.1 X |
| 4,498,696 | 2/1985 | Kalchschmied | 293/155 X |
| 4,930,279 | 6/1990 | Bart et al. | 52/717.1 X |

FOREIGN PATENT DOCUMENTS

| 2405562 | 8/1975 | Fed. Rep. of Germany . |
| 2550019 | 5/1977 | Fed. Rep. of Germany . |
| 2724425 | 3/1979 | Fed. Rep. of Germany . |
| 2930850 | 2/1981 | Fed. Rep. of Germany ........ 428/31 |
| 3740787 | 6/1989 | Fed. Rep. of Germany . |

Primary Examiner—Dennis H. Pedder
Attorney, Agent, or Firm—Antonelli, Terry, Stout & Kraus

[57] ABSTRACT

In order to arrange molded parts such as bumpers or their trim for automotive vehicles with maximum integration into the body, i.e. in order to attain a most extensively contour-hugging transition from the sheet-metal to the plastic geometry of the vehicles, the juncture between the topside of the molded part and the body panel located thereabove must be kept as narrow as possible. For this purpose, a guide rail to be attached to the body panel of the vehicle is provided which has an elongated slot formed between two webs. The molded part is inserted with a sliding seat with its strip-shaped projection into the elongated slot. The thickness of the top web determines the dimension of the juncture, i.e. the web serves as a spacer. For mounting the molded part to the body, the elongated slot exhibits at least one zone widened in the manner of a pocket, in which the molded part can be fixedly mounted in a shapemating fashion with its projection or with an additional strap-like extension with the aid of a clamping wedge. The molded part thus can be mounted in a simple way even in case of narrow junctures, any damage to the paint being reliably precluded.

10 Claims, 1 Drawing Sheet

ARRANGEMENT OF MOLDED PARTS SUCH AS BUMPERS OR THEIR TRIM IN AUTOMOTIVE VEHICLES

This is a continuation of application Ser. No. 582,399 filed Sep. 12, 1990, now abandoned.

FIELD OF THE INVENTION

This invention relates to the arrangement of molded parts, such as bumpers or their trim, in automotive vehicles in which the body of the vehicle is provided on front, rear and/or lateral surfaces with an embossed portion or indentation wherein the molded part is attached so that damage to paint on the surfaces of the vehicle can be prevented during relative movement between the molded part and the body.

BACKGROUND OF THE INVENTION

It is known to provide the body of automotive vehicles, especially passenger cars, in the zone of the front, rear and/or lateral surfaces with an embossing or indentation for the arrangement of the bumper and/or its trim in order to locate the bumper, but especially its trim, within the body in a "so to speak" more or less integrated fashion. For this purpose, the body is "tucked in" more or less deeply in the region of these molded parts, with a generally slightly inclined ledge being provided between the upper portion of the body wall and the retracted portion of the wall. In any vehicle, a spacer gap must be determined of, for example, 10 to 15 mm, between the top edge of the molded part and the body panel and/or the ledge, so that the paint will not be damaged in case of relative motion between the molded part and the body.

If this juncture is to be very narrow, for instance only 1 to 2 mm, then special measures must be taken. It is known, in this connection, for example, to glue a pint protective film in place, mostly in overhead work. Also, soft profiled sealing strips can be placed onto the molded part, with additional steps being necessary for ensuring a linear top edge.

Since every car body has manufacturing tolerances, the width of the juncture gap is also subject to a corresponding tolerance. Consequently, the juncture width varies not only from one vehicle to the next, but also over the length of the molded part proper.

SUMMARY OF THE INVENTION

The invention is based on the object, in an arrangement of molded parts as heretofore described, of reliably maintaining a structurally fixedly determined narrow juncture gap (i.e. separation of the molded part from the body of the vehicle) with simple assembly and exclusion of damage to the paint.

This object has been attained by the structure or arrangement of the mounting means for the molded part on the vehicle body, said means including a guide rail with an elongated slot for accommodating projections or edges of the molded part. The guide rail, according to this invention, is made from a synthetic resin, such as, for example, polycarbonate, polyamide, or polyester, preferably by injection molding. A flange-like web of the rail in contact with a ledge of the body ensures the defined, very small gap width (i.e. separation) and simultaneously the avoidance of damage to the paint. This furthermore eliminates as well any special adjustment work during assembly, unparallel extension of the juncture, or waviness of the top edge of the molded part in account of manufacturing warpage. Since the molded part is inserted with a strip-shaped projection thereof with a sliding seat into the elongated slot of the guide rail, the stress-free equalization of dimensional deviations due to manufacturing tolerances or thermal expansions is thereby ensured at the same time.

Insofar as the molded part involves, for example, the trim for the forward bumper of a vehicle, the provision can be made that the trim is attached in its central zone conventionally at the body and, in the region of the two lateral legs, respectively, one guide rail is arranged in a corresponding embossed portion of the body, the legs of the trim being held therein in a displaceable fashion.

However, in an advantageous embodiment of the invention, a mounting means with a particular type of elongated slot is provided. This mounting means is especially suited for a bumper to be arranged at the rear of the vehicle, but it can, of course, likewise be provided, for example, as a front bumper. In this arrangement, the guide rail extends preferably over the entire width of the rear portion and the adjoining lateral legs. In order to compensate for manufacturing tolerances, the rail is preferably designed as a divided component. Instead of the at least one pocket-like widened portion located, for example, in the center of the elongated guide rail, it is also possible to arrange, for example, two widened portions fashioned to be symmetrical with respect to the center and located at a small spacing therefrom. By means of this simple and readily mountable attachment of the molded part, the "floating" support of the latter is ensured so that there will be no warpage even in case of extreme temperature stresses, for example.

The strength of the aforementioned connection can be still further enhanced by a structure wherein the molded part is provided with a strap-like extension. The configuration of the guide rail proper and its advantageous embodiment are further disclosed herein.

BRIEF DESCRIPTION OF THE DRAWINGS

The invention is illustrated schematically in the accompanying drawing in one embodiment and will be described in greater detail hereinafter with reference thereto. In the drawing.

DETAILED DESCRIPTION OF THE INVENTION

Figure 1:
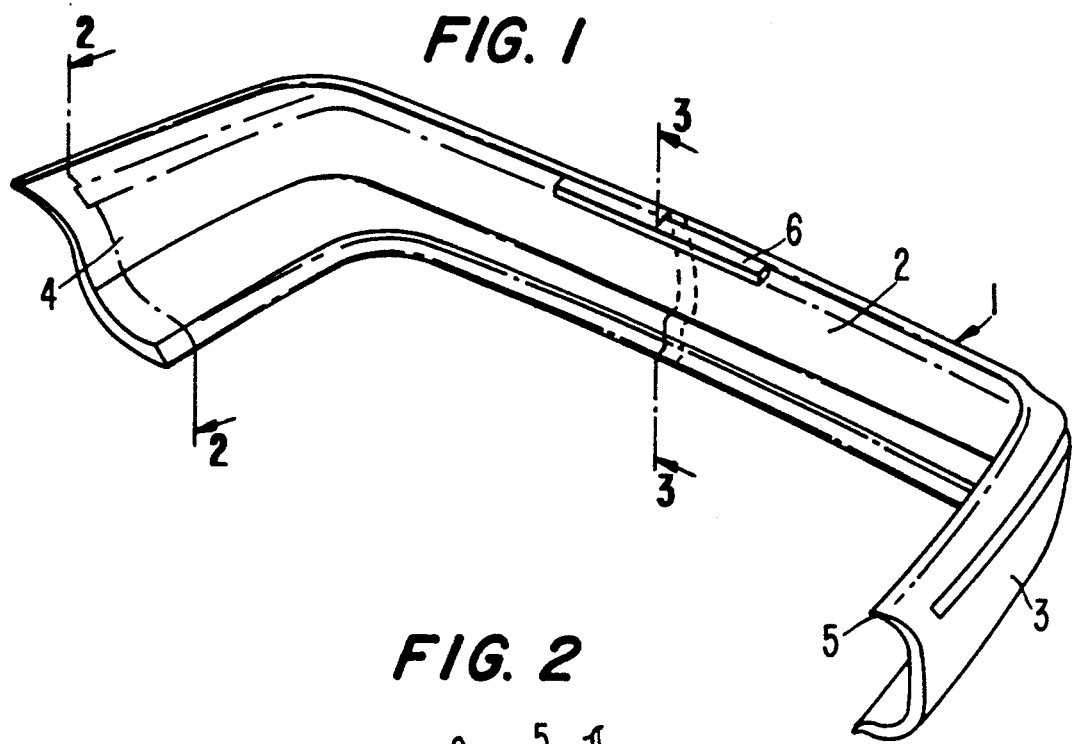
FIG. 1 shows the trim of a rear bumper in a perspective view.

The molded part 1 illustrated in FIG. 1, namely the trim for a rear bumper, comprises the central zone 2 extending over the width of the vehicle (not shown) and the two lateral legs 3 and 4, with a strip-shaped projection 5 being provided at a top edge of the molded part 1. The central zone 2 additionally contains the strap-like extension 6 in a central location on the strip-shaped projection 5. The molded part 1 is produced in a conventional manner, for example, by injection molding, from polypropylene.

Figure 2:
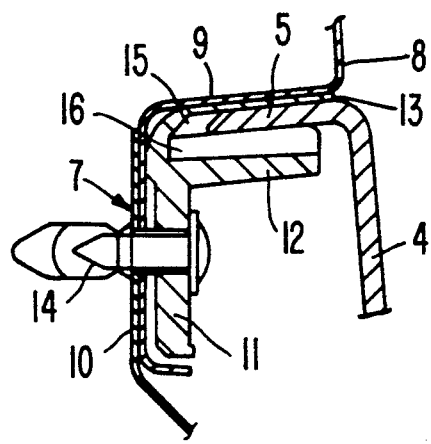
FIG. 2 shows a fragmentary sectional view taken along line 2—2 in FIG. 1 with a portion of the body wall of a vehicle (not shown in FIG. 1)

In FIG. 2, the embossed portion 7 of the body wall of a vehicle can be seen in the region of the lateral leg 4 wherein an upper body wall 8 passes over into a vertical wall section 10 of the body by way of a ledge 9 which is slightly inclined for reasons of manufacturing technology. A guide rail 11 at and upper end thereof facing the ledge 9 includes an inner web 12 and an outer web 13 extending over the length of of the rail 11, with and elongated slot 15 being formed between the webs 12, 13. The elongated slot 15 is open toward the outside, i.e. toward a side facing away from the vertical wall section 10. The guide rail 11 is mounted to the vertical wall section 10 of the body by a dowel 14 in a conventional way in a gas and watertight fashion in such a manner that the outer web 13 is in close contact with the ledge 9 of the body of the vehicle. The strip-shaped projection 5 of the molded part 1, of which here a portion of the side leg 4 can be seen, is inserted with sliding fit into the elongated slot 15, with the projection 5 resting with its underside on spacer ribs 16 arranged at a spacing distributed over the length of the guide rail 11 within the slot 15 and joined to the web 12. The projection 5 of the lateral leg 4 does not entirely occupy the longitudinal slot 15 in order to obtain a vacant space for tolerance compensation. The thickness of the web 13 determines in a defined way the structurally determined narrow spacing or separation between the trim of the bumper and the body of the vehicle, and herein simultaneously precludes safely any damage to paint during relative movement of the trim. As can be seen, the result is a most extensive contour-hugging transition from the sheet-metal to the synthetic resin geometry of the vehicle with a very narrow juncture width. This integrated design ensures a very esthetic outer appearance, particularly if the trim has the same color as the body.

In order to compensate for tolerances with respect to the body and the guide rail 11, the guide rail 11 is designed, for example, to be tripartite, in that it is divided at the transition from the lateral legs 3 and 4 to the central zone 2, and these sections are individually attached to the body by the dowels 14. The spacer ribs 16 are arranged, for example, at a spacing of 20 to 100 mm. The insertion depth of the projection 5 into the elongated slot 15 amounts to about 10 to 20 mm, for example, in the lateral leg region.

Figure 3:
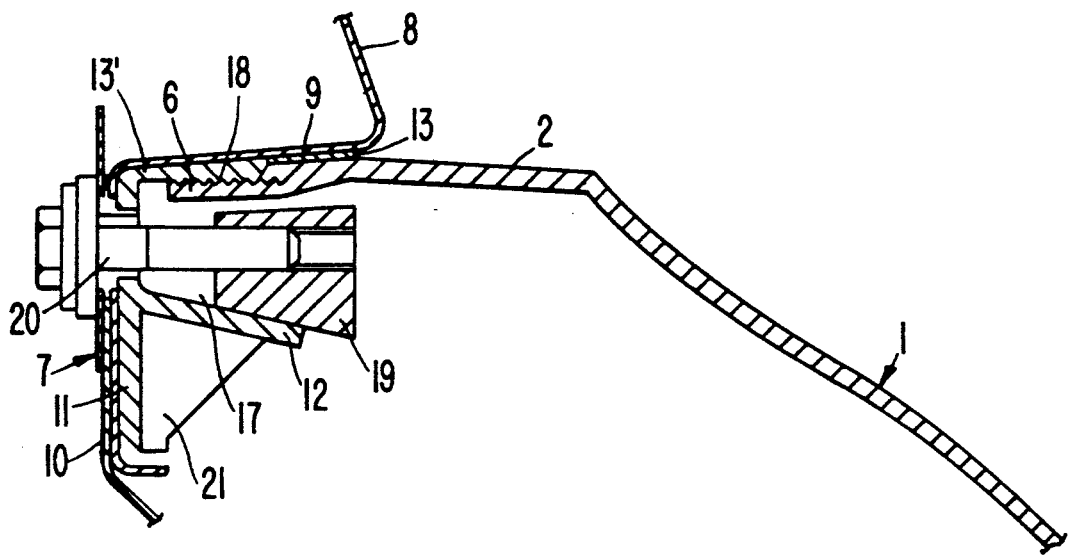
FIG. 3 shows a fragmentary section view analogously to FIG. 2 taken along line 3—3 in FIG. 1.

The mounting zone illustrated in FIG. 3 reveals, as compared with FIG. 2, clearly the larger depth of the embossing 7 exhibiting a correspondingly larger width of the ledge 9, as viewed in the longitudinal extension of the vehicle. The elongated slot 15 of the guide rail 11 is here interrupted by the pocket-like widened portion 17 and/or passes over into the latter, with the widened portion 17 being formed between the webs 12 and 13. The web 13 determines, as in FIG. 2, the juncture gap width or separation with its end facing away from the body wall 10. In an inner zone 13', facing the guide rail 11 and, respectively, the vertical wall section 10 of the body, the web 13 is fashioned with a greater thickness and with transverse serration 18. The molded part 1 is in contact with this zone with its strap-like extension 6 provided with a corresponding transverse serration. Finally, a clamping wedge 19 is additionally inserted in the widened portion 17, with wedge being adapted to be adjusted by means of the screw 20 into its final position towards the vertical wall section 10 of the body and urging the extension 6 and projection 5 firmly against the web 13 and the ledge 9. The clamping wedge 19 is in this case designed to be asymmetrical, but it could also by symmetrical. The inclination of the contact surfaces of the clamping wedge 19 is adapted to the inclination of the corresponding counter surfaces of the strap-like extension 6 and of the web 12. In order to increase the strength, discrete supporting ribs 21 are, in turn, provided between the web 12 and the lower zone of the guide rail 11. The width of the pocket 17 is, for example, 50 to 150 mm. Instead of such a pocket in a central location of the rear part of the vehicle, it is, however, likewise possible to arrange two corresponding pockets formed at a spacing of about 50 to 250 mm from the center of the vehicle at the rail 11. With this readily performable mounting of the trim by way of clamping wedge, a firm seating at the body is ensured after a stress-free assembly, and at the same time the compensation of dimensional deviations on account of manufacturing tolerances or thermal expansions is made possible.

What is claimed is:

1. An arrangement of a U-shaped molded bumper with a front portion and side portions for an automotive vehicle, wherein a body of the vehicle is provided on at least one of front, rear and lateral surfaces with an embossed portion forming a ledge, wherein the molded bumper is attached to the body so that the molded bumper is located at a distance from the ledge, a guide rail is arranged in a zone of the embossed portion, said guide rail has, on a side thereof facing the ledge, an elongated slot formed by mutually opposed internal and external webs extending over a length of the guide rail, said guide rail is attached to the body of the vehicle in such a manner that the external web is in contact with the ledge, and wherein the molded bumper includes a strap-shaped extension on said front portion and a strip-shaped projection on at least one of said side portions both of which are inserted into the elongated slot, with the strap-shaped extension being adapted to be retained in the elongated slot by retention means.

2. An arrangement according to claim 1, wherein the elongated slot has at least one pocket-shaped widened portion resulting from an increase in a spacing between the internal and external webs, and wherein the strap-shaped extension is urged against the external web by a clamping wedge forming said retention means, and wherein said clamping wedge is wedged into the pocket-shaped widened portion and tightened in a direction toward the body of the vehicle.

3. An arrangement according to claim 2, wherein the internal and external webs are extended, in the pocket-shaped widened portion in correspondence with a locally larger depth of the embossed portion.

4. An arrangement according to one of claims 2 or 3, wherein in the widened portion, the external web contacts the strap-shaped extension in a shape-mating fashion by transverse serrations formed in said external web and said strap-shaped extension.

5. An arrangement according to claim 1, wherein said retention means includes a clamping wedge.

6. An arrangement according to one of claims 2 or 3, wherein the widened portion has an open end and a closed end, and wherein the widened portion, as viewed in cross section, narrows in a wedge-shape from the open end toward the closed end.

7. An arrangement according to claim 6, wherein supporting ribs are provided on the guide rail in a region of the widened portion for supporting the internal web.

8. An arrangement according to claim 4, wherein supporting ribs are provided on the guide rail in the region of the widened portion for supporting the internal web.

9. An arrangement according to claim 8, wherein the widened portion includes an open end and a closed end, and wherein the widened portion, as viewed in cross section, narrows in a wedge shape from the open end toward the closed end.

10. An arrangement according to claim 1, wherein a plurality of spacer ribs are arranged over a length of the guide rail within said elongated slot for supporting the strip-shaped projection in said elongated slot.

* * * * *